(12) United States Patent
Bubie et al.

(10) Patent No.: US 6,453,078 B2
(45) Date of Patent: Sep. 17, 2002

(54) SELECTING, ARRANGING, AND PRINTING DIGITAL IMAGES FROM THUMBNAIL IMAGES

(75) Inventors: Walter C. Bubie, Rochester, NY (US); Cathryn Q. Lodine, Acton, MA (US); Laurent P. Ricard, Boulogne-Billancourt (FR); Richard Brindley, Ley Hill Chesham (GB); William R. O'Such, Paris (FR); Joseph P. Rinaudo, Winter Garden, FL (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/141,686

(22) Filed: Aug. 28, 1998

(51) Int. Cl.$^7$ .................................................. G06K 9/00
(52) U.S. Cl. ........................ 382/305; 382/296; 707/517
(58) Field of Search .................... 382/180, 294, 382/296, 305; 707/520, 524, 525, 517, 519, 530; 355/40; 358/453, 450; 345/628, 649, 689

(56) References Cited

U.S. PATENT DOCUMENTS

| | | | |
|---|---|---|---|
| 4,607,949 A | 8/1986 | Hakamada et al. | ........... 355/40 |
| 5,109,281 A | 4/1992 | Kobori et al. | .............. 358/296 |
| 5,274,418 A | 12/1993 | Kazami et al. | ................ 355/40 |
| 5,563,984 A | 10/1996 | Tanibata | ..................... 395/105 |
| 5,757,963 A | * 5/1998 | Ozaki et al. | ................. 382/209 |
| 5,973,734 A | * 10/1999 | Anderson | .................... 348/239 |
| 6,028,603 A | * 2/2000 | Wang et al. | .................. 345/350 |
| 6,035,093 A | * 3/2000 | Kazami et al. | ................ 386/52 |
| 6,035,323 A | * 3/2000 | Narayen et al. | ............ 709/201 |
| 6,058,428 A | * 5/2000 | Wang et al. | .................. 709/232 |
| 6,097,389 A | * 8/2000 | Morris et al. | ................ 345/346 |
| 6,154,755 A | * 11/2000 | Dellert et al. | ................ 707/526 |
| 6,202,061 B1 | * 3/2001 | Kuosla et al. | ................. 707/3 |

* cited by examiner

*Primary Examiner*—Yon J. Couso
(74) *Attorney, Agent, or Firm*—Pamela R. Crocker

(57) ABSTRACT

A method for selecting and arranging digital images to be printed from a group of thumbnail images is disclosed. The method comprises the steps of displaying the group of thumbnail images; selecting, from the group of thumbnail images, the number of images to be printed per page and the images which are to be printed on each page; automatically arranging the selected images for each page to be printed; and printing the arranged images.

16 Claims, 7 Drawing Sheets

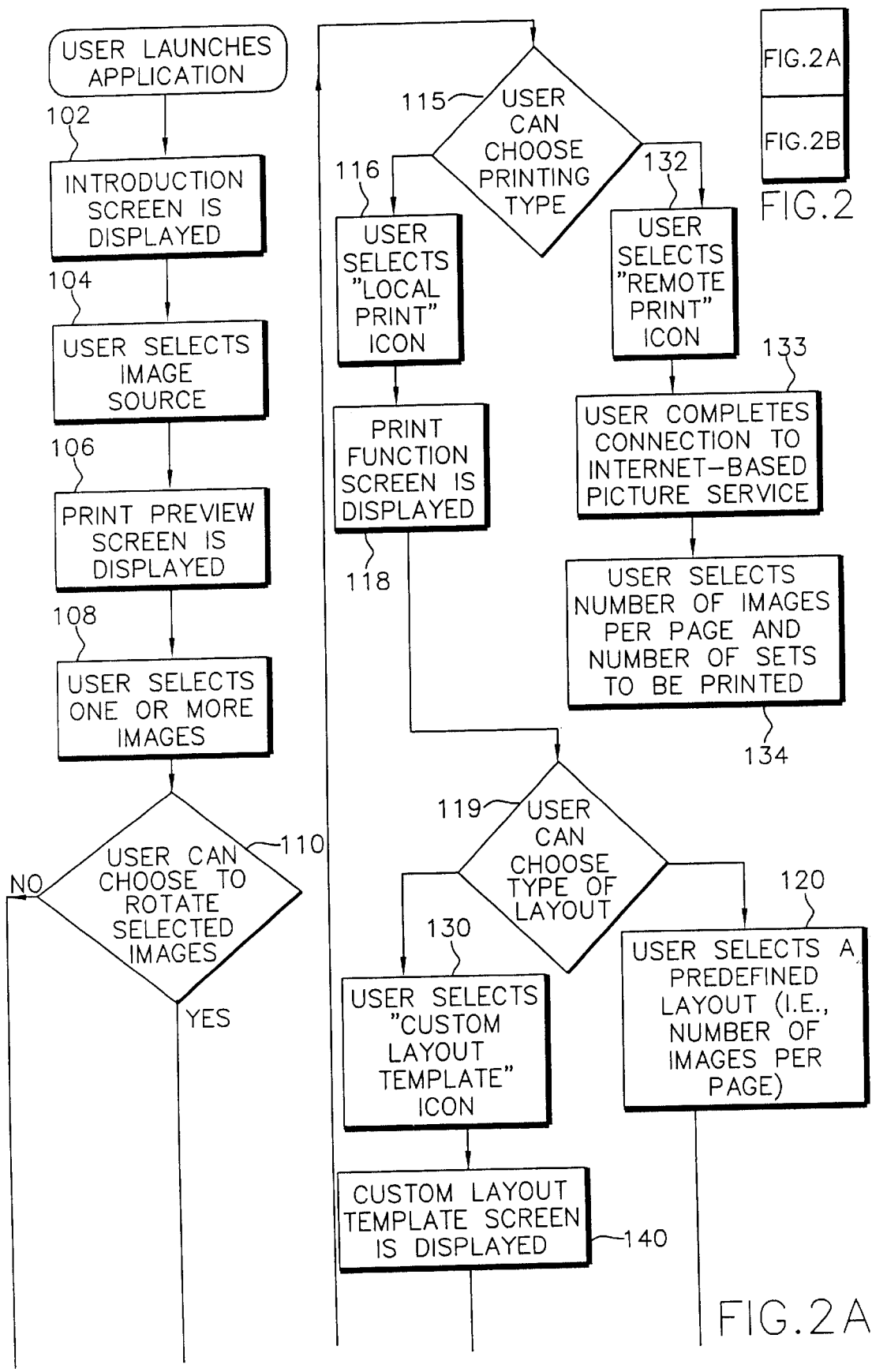

SELECTING, ARRANGING, AND PRINTING DIGITAL IMAGES FROM THUMBNAIL IMAGES

FIELD OF THE INVENTION

The present invention relates to digital image processing, and in particular, to selecting and arranging multiple digital images from a group of thumbnail images and printing such selected images.

BACKGROUND OF THE INVENTION

To become mass market products, computer-based digital photography systems must offer consumers the ability to easily organize and print digital images. In particular, it should be simple to choose from all of the images taken by a camera, or stored on a disc, a set of a dozen or more images to be printed all at once. Unfortunately, existing prior art systems require the user to choose a first image, go through a process to print it, then choose a second image and repeat the same process a second time for this second image and again for all of the images to be printed.

It may also be desirable for a user to choose a set of images to be printed on a single page with all selected images being equally sized and properly positioned. For example, the user may wish to print groups of four different images on an 8"×10" home printer. Microsoft PictureIt™ version 1.0 includes an image input screen ("get it" screen) that provides multiple reduced resolution, or "thumbnail", images, but the thumbnail images must be dragged and dropped one at a time from the preview image type screen to a filmstrip. Next, the user must exit the image input mode and switch to a print layout mode within a "share it" screen. In this mode, the user must drag and drop the first image from the filmstrip into the print layout screen. The user must then manually resize, rotate (if required), and position the first image, for example, in the upper left of the screen. Next, the user selects the second image and manually attempts to properly size and position this image, for example, in the upper right of the screen. Finally, after all four images have been manually resized and positioned, the composite image is ready to print. Thus, creating a page with four equally sized and properly positioned images requires the user to perform many manual operations.

Other prior art software programs also permit the user to view a two-dimensional array of thumbnail images (sometimes called a "contact sheet" or a "gallery") to facilitate selection. However, these galleries are used only to select which images may be "opened" by the program for further manual, picture by picture editing. For example, LivePiX™ version 1.1 has such a gallery, but it only allows the user to select one image, which is then opened. After the image is opened, it may be manually sized, copied, and pasted into a collage image in a manner similar to PictureIt. MGI Photosuite™ Special Edition includes a "Photo Album" with a gallery type feature. The order of the thumbnail images may be rearranged to later allow a "slideshow" of images to be viewed, one after another in the desired order. But the user cannot select multiple images from the gallery to print or to move to another gallery.

U.S. Pat. No. 4,607,949 discloses a method of printing photographic images in which a plurality of photographs taken on a photo negative film and explanatory captions of the photographs are printed together on a sheet of photographic paper. U.S. Pat. No. 5,109,281 discloses a video printer adapted for printing multiple images on a single sheet. U.S. Pat. No. 5,274,418 discloses an image processing system which reproduces a plurality of photographs on a single sheet of photographic paper in an album-like format. Although the methods described in the aforementioned patents include photographically printing multiple images per page, a user cannot select multiple images on a computer and automatically print the selected images.

SUMMARY OF THE INVENTION

It is an object of the present invention to provide a method which enables multiple images to be easily printed on a hardcopy printer.

It is another object of the present invention to provide a method which enables multiple different images to be properly sized and positioned to be printed on a single page.

It is a further object of the present invention to provide a method which enables a user to easily select one or more images from a preview screen gallery of thumbnail images and automatically print the selected images with several different images properly sized and positioned on each page.

These objects are achieved in a method for selecting and arranging digital images to be printed from a group of thumbnail images, comprising the steps of:

(a) displaying the group of thumbnail images;

(b) selecting, from the group of thumbnail images, the number of images to be printed per page and the images which are to be printed on each page;

(c) automatically arranging the selected images for each page to be printed; and (d) printing the arranged images.

ADVANTAGES

An advantage of the present invention is to enable a user to select a set of images from a group of thumbnail images to be printed, including the number of images to be printed per page, and to automatically print the selected images.

Another advantage of the present invention is to enable the selected images to be properly sized and positioned on each page for printing without user intervention.

DETAILED DESCRIPTION OF THE PREFERRED EMBODIMENT

Figure 1:
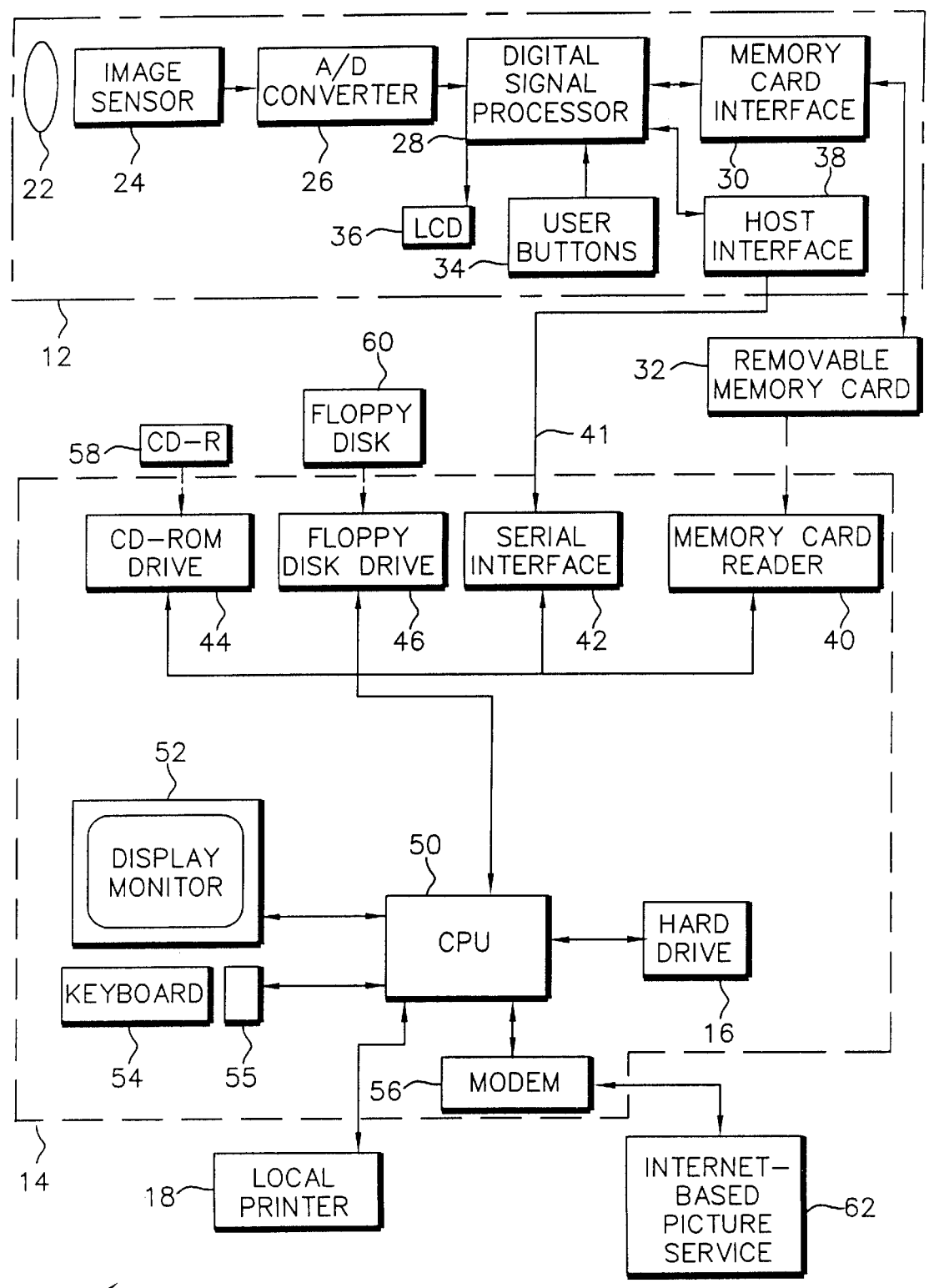
FIG. 1 is a block diagram of a system which includes a digital camera that can use the method of the present invention to select digital images from a group of thumbnail images for printing, and arrange and print the images.

FIG. 1 shows a block diagram of a system 10 which utilizes the present invention. The system 10 includes a digital image source which is shown as a digital still camera 12; and a user's host computer 14 with a hard drive 16, a central processing unit (CPU) 50, a display monitor 52, a keyboard 54, a mouse 55, a printer 18, and a modem 56.

The digital still camera 12 is used to capture images, and can be, for example, the Kodak Digital Science DC210™ zoom camera sold by Eastman Kodak Company. The digital still camera 12 can be rotated from a landscape orientation to a portrait orientation when certain images are taken to provide the best composition. As shown in FIG. 1, the digital still camera 12 includes a lens 22 which directs image light from a subject (not shown) upon an image sensor 24, which can be either a conventional charge coupled device (CCD) sensor or a complementary metal oxide semiconductor (CMOS) imager. The image sensor 24 produces an analog image signal that is converted into a digital image signal by an analog-to-digital (A/D) converter 26. The digitized image signal is processed and compressed by a digital signal processor 28. The digital signal processor 28 compresses each still image according to any one of a number of known image compression algorithms, such as well-known JPEG (Joint Photographic Experts Group) discrete cosine transformation-based compression algorithm. The digital signal processor 28 applies the compression algorithm to the digital image data, and sends the compressed image data to an image display 36, such as a color liquid crystal display (LCD), where the user can view the captured image. The compressed image signal is then transferred through a memory card interface 30 to a removable memory card 32 where it is stored. User buttons 34 are used to control the operation of the digital still camera 12 in a well known manner.

The memory card 32 can be adapted to the PCMCIA card interface standard, such as described in the PC Card Standard, Release 2.0, published by the Personal Computer Memory Card International Association, Sunnyvale, Calif., September, 1991. The memory card 32 accordingly contains solid state memory, such as Flash EPROM memory, which the memory card 32 uses to store image data files. Electrical connection between the memory card 32 and the digital camera 12 is maintained through a card connector (not shown) positioned in the memory card interface 30. The memory card interface 30 and the card connector provide, e.g., an interface according to the aforementioned PCMCIA card interface standard. The memory card 32 can also be inserted into a memory card reader peripheral 40 in the host computer 14 which is also adapted to the PCMCIA interface standard. This enables images stored on the memory card 32 to be downloaded into the host computer 14. The compressed image signal can also be sent to a serial interface 42 of the host computer 14 through either a cable 41, which is connected to the digital camera 12 through a host computer interface 38, or a wireless interface, such as an infrared interface (not shown).

Alternatively, film exposed in a conventional camera can be developed, scanned and stored on a recordable compact disk (CD-R) 58, for example, in the FlashPix™ image format, to provide the digital image input. The CD-R 58 can be inserted into a compact disk read only memory (CD-ROM) drive 44 in the host computer 14. Similarly, the images can be stored on a floppy disk magnetic medium 60, such as Kodak's Picture Disk™, to provide the digital image input, and inserted into a floppy disk drive 46 in the host computer 14. In addition, images can be provided by an internet-based picture service 62, and downloaded via the modem 56.

The digital images are downloaded to the host computer 14 through the CPU 50 and can be stored on the hard drive 16. Application program or software for the present invention is incorporated into the hard drive 16 of the host computer 14, and then downloaded to a computer random access memory (RAM) when the program is used by the CPU 50.

Preferably, the application software that implements the method of the present invention uses the FlashPix™ image format, described in FlashPix™ Specification, version 1.0, to store and process the images. Images provided by sources in other formats can be converted to the FlashPix™ format.

Prints of the images can be made on the printer 18 connected to the host computer 14, for example, onto 8½ inch paper in a color ink jet printer. It can be appreciated that images could also be sent to a remote printer (not shown), such as the internet-based picture service 62, which could support printing of multiple images on a single page.

Figure 2B:
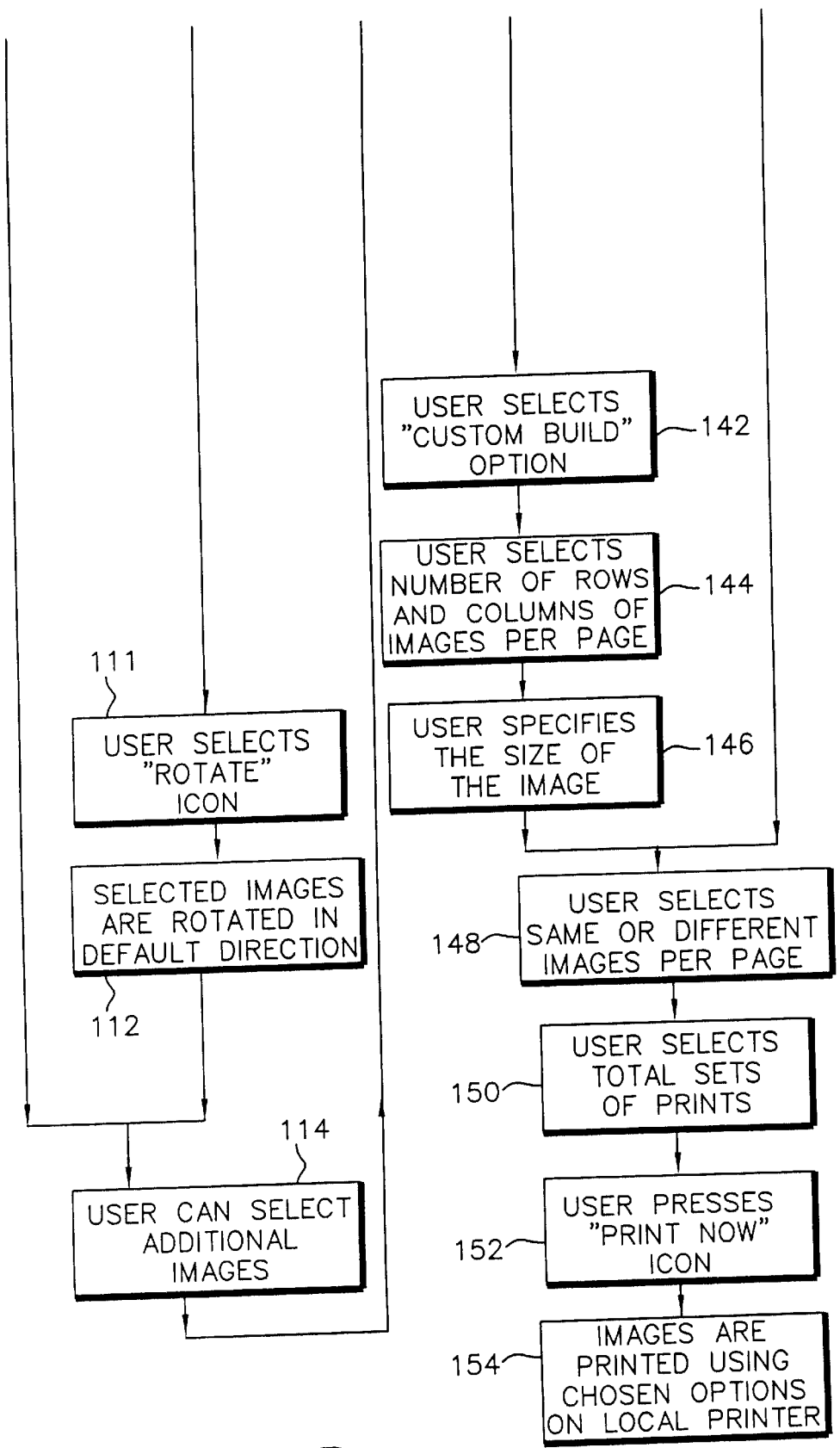
FIG. 2 is a flow diagram in block form showing the method of the present invention.

A flow diagram of the process of the present invention using the application software delivered to the RAM of the CPU 50 is shown in FIG. 2. When the user launches the application program (block 100), an introduction screen is displayed (block 102) on the display 52 of the host computer 14. The user selects the image source (block 104) using a first computer display screen 200 showing various image source selections. The image source selections can include, for example, the digital still camera 12, a scanner (not shown), the floppy disk 60, the CD-R 58, such as the Kodak PhotoCD™ disc, the user's hard drive 14, and images available via the internet-based picture service 62.

Figure 3:
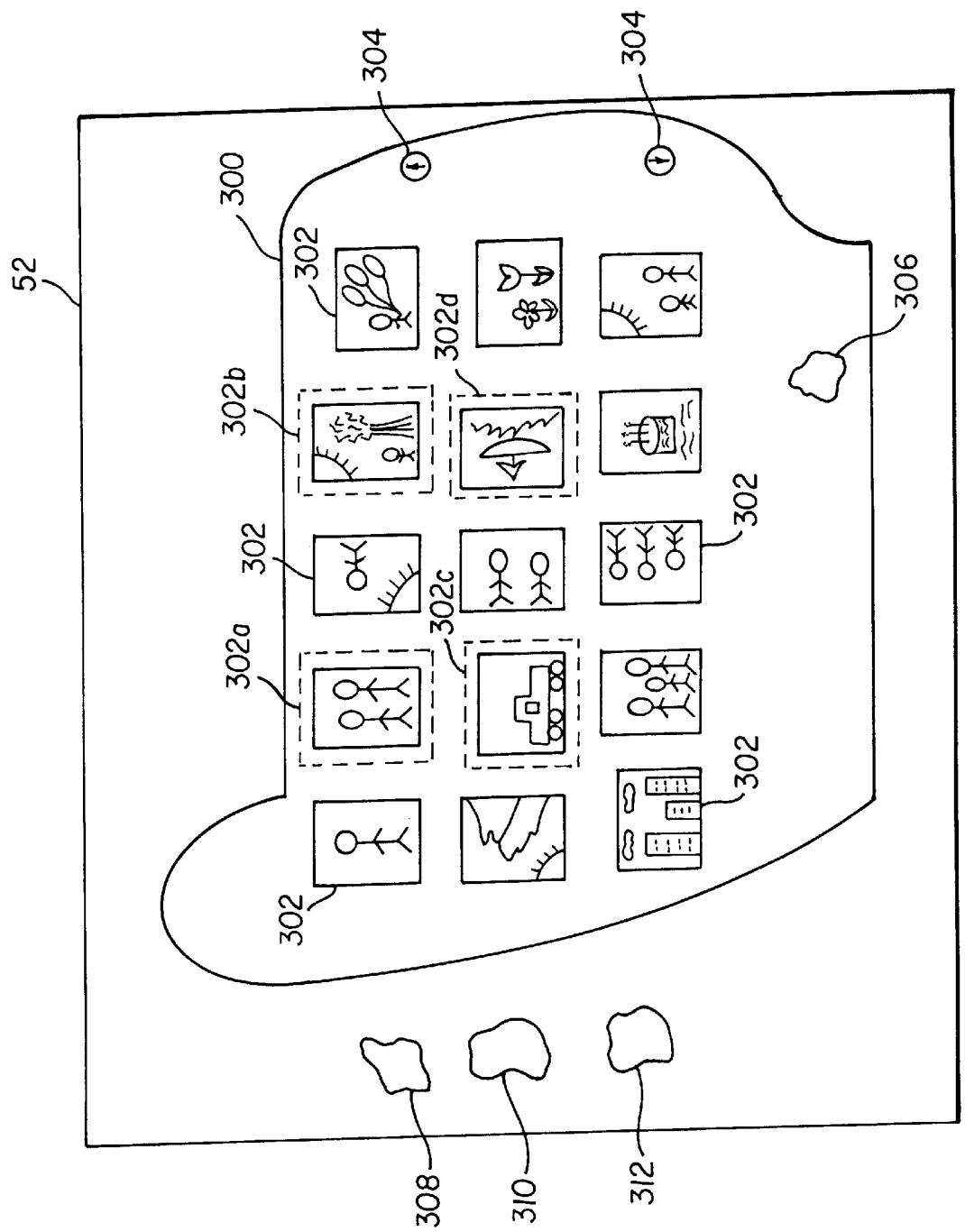
FIG. 3 is a diagram of a computer display screen displaying a group of thumbnail images in which a user can select images for printing in accordance with the present invention.

Once the image source is selected, a "preview picture screen" 300 (shown in FIG. 3) is displayed on the display screen 52 (block 106) showing a two-dimensional array of thumbnail images 302 obtained from the image source. The thumbnail images 302 preferably have a lower resolution than the actual image data. The user can select multiple images (e.g., five images) by pressing either a control key (not shown) or a shift key (not shown) on the keyboard 54 while clicking the mouse 55 on any number of thumbnail images 302 (block 108). FIG. 3 shows that four thumbnail images 302a, 302b, 302c, and 302d (which are outlined) have been selected. If the image source 12 contains a large number of thumbnail images 302, arrow controls 304 on the right portion of the "preview picture screen" 300 enable the user to scroll through the larger number of thumbnail images 302 to view a group of the thumbnail images 302 (e.g., 15 thumbnail images) at a time.

Once one or more thumbnail images 302 have been selected (block 108), the user can choose to rotate the selected images 302 (block 110) by selecting a "rotate" icon 306 (block 111). The computer then automatically rotates the image in a default direction (e.g., 90 degrees clockwise) (block 112), preferably by modifying the FlashPiX™ image format viewing parameter, or alternatively, by properly exchanging the row and column image data.

The user can then select additional images (e.g., three images) to be printed with the first group of selected images obtained in block 108 by again pressing the control key or the shift key on the keyboard 54 while clicking the mouse 55 on any number of thumbnail images 302 (block 114).

Figure 4:
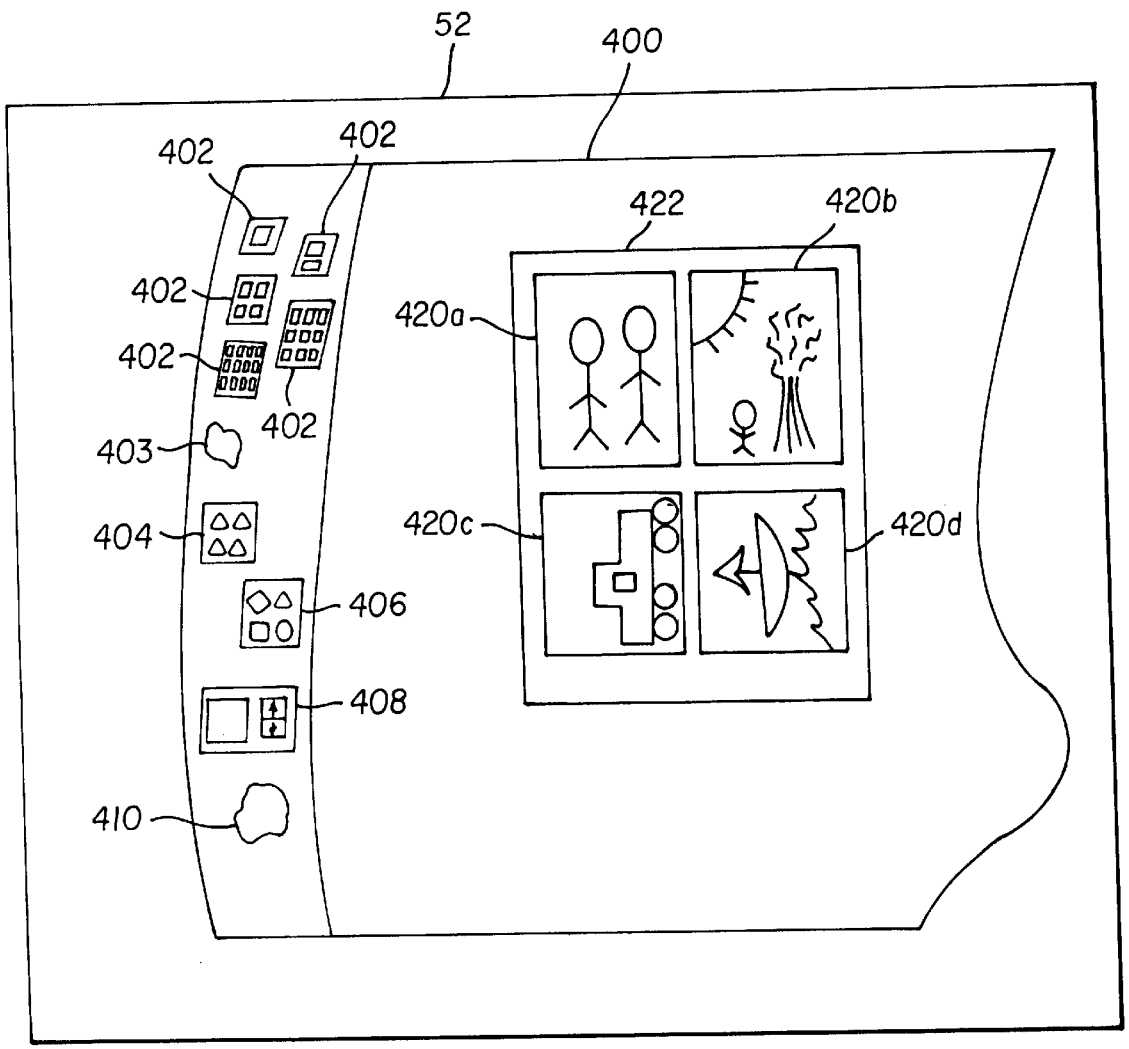
FIG. 4 is a diagram of a print function display screen in which a user can choose the number of images to appear on each page, the specific images to appear on each page, and the number of copies of each page to be printed in accordance with the present invention.

The "preview picture screen" 300 also displays a set of function icons on the periphery of the screen 300, including a "local print" icon 308 and a "remote print" icon 310. The user then selects the type of printing. The user can print all of these selected images on the local printer 18, for example, a color ink jet printer, by clicking on the "local print" icon 308 (block 116). This brings up a "print function display screen" 400 (block 118) shown in FIG. 4. The user then chooses a type of layout (block 119). The user can choose one of several predefined "layout" icons 402 on the periphery of the "print function display screen" 400 which determines how many pictures appear on each page by selecting, for example, 1, 2, 4, 9, or 16 images to be printed per page (block 120). Once a predefined layout is chosen, the images to be printed appear in a print preview area 422 on the "print function display screen" 400. Based on the number of selected pictures to be printed on a page, the program will automatically select the orientation of the images to best fill up the page. FIG. 4 shows, as an example, four images 420a, 420b, 420c, and 420d, which correspond to the selected thumbnail images 302a, 302b, 302c, and 302d, respectively, shown in FIG. 3. Alternatively, the user can choose to "build" a page template with any number of images per page by selecting a "custom layout template" icon 403 (block 130 in FIG. 2), which will be described in more detail below.

Next, the user chooses whether to have the same or different images appear on each page (block 148). To have the same one image repeated on one page to be printed (e.g., four copies of one image per page), the user selects a "grouping" icon 404. Alternatively, to have all of the selected images appear on the page(s) to be printed (e.g., four different images on one page), the user selects a "collating" icon 406.

The user then chooses the number of sets of images to print (block 150), for example, three copies of each laid out page, by typing in the number of desired sets in a text field 408 on the left portion of the "print function display screen" 400. After making these selections, the user can press a "print now" icon 410 (block 152) and walk away from the host computer 14. Each of the selected images will be printed automatically on the local printer 18 (block 154), without further user interaction.

The program prepares the printed layout by calculating the image size which enables the selected number of images to fit on a page, and rotating the selected images as necessary so that landscape oriented images and portrait oriented images fit together on the page to be printed. The image data is automatically interpolated or decimated to provide the proper image data to fill the page with the selected number of images. In this process, the program also calculates for "white space" to be positioned between the images to facilitate the cutting of the page into individual pictures. In other words, the program calculates the number of the selected images in vertical and horizontal directions, and calculates the size of the selected images in the vertical and horizontal directions to cause "white space" to separate the selected images. When the images are printed, the orientation of the images is printed to best "fill up the page" based on the selected number of images.

Figure 5A:
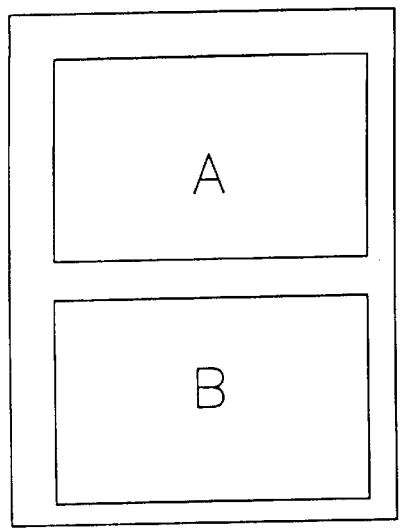
FIGS. 5A, 5B, and 5C show exemplary page layouts for one page in which two different images are printed, one page in which four different images are printed, and one page in which two copies of the same image are printed, respectively.
Figure 5B:
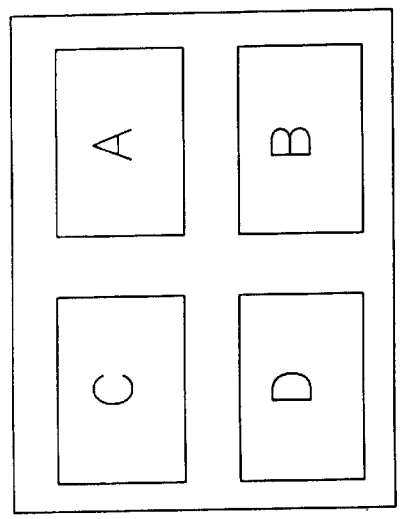
Figure 5C:
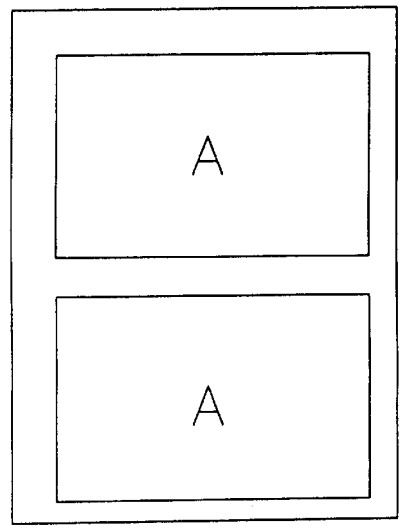

FIGS. 5A, 5B and 5C are examples of images which have been printed. FIG. 5A shows two different images (A and B) which have been printed on one page. FIG. 5B shows four different images (A, B, C, and D) which have been printed on one page. In FIG. 5B, the program has automatically rotated the orientation of the four images (A, B, C, and D) so that they fit on one page with minimum "white space" between the images. FIG. 5C shows two copies of the same image (A) which have been printed on one page.

Instead of choosing to print the image on the local printer 18 (block 116 in FIG. 2), the user could choose to instead have the prints made by a remote printing service connected via a network, such as the internet-based picture service 62, which could support the printing of multiple images. In this case, the user instead selects the "remote print" icon 310 (block 132) on the "print preview screen" 300 shown in FIG. 3. The user completes a connection process (block 133) to the internet-based picture service 62 via the modem 56, and the selected thumbnail images 302 are uploaded and displayed on the display monitor 52 of the host computer 14. The user would select the number of images per page and the number of sets per page (block 134) based on the specific features of the internet-based picture service 62.

Figure 6:
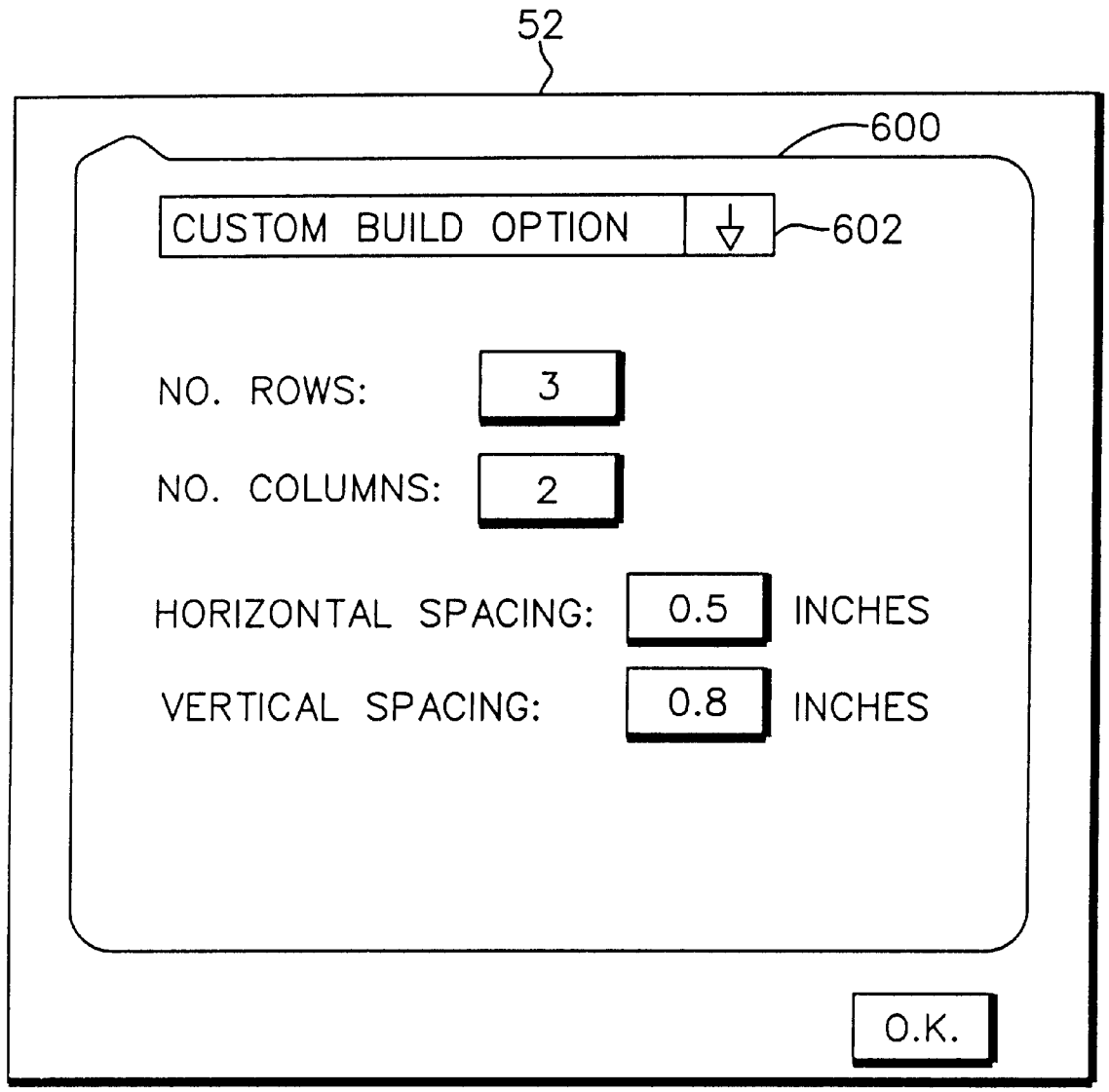
FIG. 6 is a diagram of a custom layout template screen in which a user can "build" a page template.

If the user selects the "custom layout template" icon 403 (block 130 in FIG. 2) instead of one of the predefined "layout" icons 402 (block 120), a "custom layout template screen" 600 is displayed (block 140) as shown in FIG. 6. Next, the user selects a custom build option 602 (block 142). In addition, the user selects the number of rows and columns of images to appear on a page (block 144), and selects the size of the images (block 146) by selecting, for example, the size of the horizontal and vertical "white space" between the images (as shown in FIG. 6), or the desired width and height of the images (not shown). The user then exits this "custom layout template screen" 600 and returns to the "print function display screen" 400 shown in FIG. 4. The images to be printed appear in the print preview area 422 according to the layout built by the user. The user then proceeds to choose whether to have the same or different images appear on each page (block 148 in FIG. 2) and to select the total sets of images to be printed (block 150 in FIG. 2) in a manner previously described. The user can then press the "print now" icon 410 (block 152) so that the selected images are automatically printed on the local printer 18 (block 154).

The program prepares the custom printed layout by rotating the selected images as necessary so that landscape oriented images and portrait images fit together on the page to be printed. The image data is automatically interpolated and decimated to provide the proper image data to fill the page with the selected number of images. In this process, the image is sized based on the "white,space" positioned between the images and the number of rows and columns of images specified by the user.

The invention has been described in detail with particular reference to a preferred embodiment thereof. However, it will be appreciated that variations and modifications can be effected by a person of ordinary skill in the art without departing from the spirit and scope of the invention.

PARTS LIST 10 system
12 digital still camera
14 host computer
16 hard drive
18 printer
22 lens
24 image sensor
26 analog-to-digital converter
28 digital signal processor
30 memory card interface
32 removable memory card
34 user buttons
36 liquid crystal display
38 host interface
40 memory card reader peripheral
41 cable
42 serial interface
44 compact disk read only memory drive
46 floppy disk drive
50 central processing unit
52 display monitor 54 keyboard
55 mouse
56 modem
58 recordable compact disk
60 floppy disk
62 internet-based picture service
200 first computer display screen
300 preview picture screen
302 thumbnail image
302a selected thumbnail image
302b selected thumbnail image
302c selected thumbnail image
302d selected thumbnail image
304 arrow control
306 "rotate" icon
308 "local print" icon
310 "remote print" icon
400 print function display screen
402 "layout" icon
403 "custom layout template" icon
404 "grouping" icon
406 "collating" icon
408 text field
410 "print now" icon
422 print preview area
422a image
422b image
422c image
422d image
600 custom layout template screen
602 custom build option

What is claimed is:

1. A method for selecting and arranging digital images to be printed on a medium from a group of thumbnail images, comprising the steps of:
   (a) displaying the group of thumbnail images;
   (b) a user selecting, from the group of thumbnail images, the number of images to be printed per page and the images which are to be printed on each page;
   (c) automatically arranging and orienting if necessary the selected images for each page to be printed so as to maximize the size of the selected images to be printed on each page without regard to proper visual orientation while controlling the amount of white space between the selected images to facilitate the cutting of the medium into individual pictures; and
   (d) printing the arranged images.

2. A method for selecting and arranging digital images to be printed on a medium from a group of thumbnail images, comprising the steps of:
   (a) displaying the group of thumbnail images;
   (b) a user selecting, from the group of thumbnail images, at least two images to be printed per page and the images which are to be printed on each page;
   (c) automatically arranging the selected images for each page to be printed, including:
      (i) calculating the number of selected images in vertical and horizontal directions; and
      (ii) calculating and modifying the size of the selected images in the vertical and horizontal directions so as to maximize the size of the selected images to be printed on each page without regard to proper visual orientation while controlling the amount of white space between the selected images to facilitate the cutting of the medium into individual pictures; and
   (d) printing the arranged images.

3. The method of claim 2 further including initiating the printing step by selecting a print icon on the periphery of the group of thumbnail images.

4. The method of claim 2 wherein the thumbnail images have a lower resolution than the captured digital images.

5. A method for selecting and arranging digital images to be printed on a medium from a group of thumbnail images, comprising the steps of:
   (a) displaying the group of thumbnail images;
   (b) a user selecting, from the group of thumbnail images, at least two images to be printed per page and the images which are to be printed on each page;
   automatically arranging the selected images for each page to be printed, including:
      (i) calculating the number of selected images in vertical and horizontal directions;
      (ii) calculating and modifying the size of the selected images in the vertical and horizontal directions to control the amount of white space that separates the selected images to facilitate the cutting of the medium into individual pictures; and
      (iii) automatically rotating appropriate ones of the selected images to either landscape or portrait orientations to fit the selected images on a corresponding page without regard to proper visual orientation; and
   (e) printing the arranged images.

6. A method for selecting and arranging digital images to be printed on a medium from a group of thumbnail images, comprising the steps of:
   (a) receiving digital images and providing the group of thumbnail images representing the received digital images;
   (b) displaying the group of thumbnail images;
   (c) a user selecting, from the group of thumbnail images, at least two images to be printed per page and the images which are to be printed on each page;
   automatically arranging and rotating if necessary the selected images for each page to be printed, including:
      (i) calculating the number of selected images in vertical and horizontal directions; and
      (ii) calculating and modifying the size of the selected images in the vertical and horizontal directions to control the amount of white space that separates the selected images to facilitate the cutting of the medium into individual pictures; and
   (d) printing the arranged images.

7. The method of claim 6 wherein the digital images are captured by a digital still camera.

8. The method of claim 6 wherein the digital images are provided on a disk.

9. The method of claim 6 wherein the digital images are provided by a remote network service.

10. A computer program product for selecting and arranging digital images to be printed on a medium from a group of thumbnail images, comprising a computer readable storage medium having a computer program stored thereon for performing the steps of:
   (a) displaying the group of thumbnail images;
   (b) a user selecting, from the group of thumbnail images, the number of images to be printed per page and the images which are to be printed on each page;
   (c) automatically arranging and rotating if necessary the selected images for each page to be printed so as to maximize the size of the selected images to be printed on each page without regard to proper visual orientation while controlling the amount of white space between the selected images to facilitate the cutting of the medium into individual pictures; and (d) printing the arranged images.

11. A computer program product for selecting and arranging digital images to be printed on a medium from a group of thumbnail images, comprising a computer readable storage medium having a computer program stored thereon for performing the steps of:

(a) displaying the group of thumbnail images;

(b) a user selecting, from the group of thumbnail images, at least two images to be printed per page and the images which are to be printed on each page;

(c) automatically arranging the selected images for each page to be printed, including:
  (i) calculating the number of selected images in vertical and horizontal directions; and
  (ii) calculating and modifying the size of the selected images in the vertical and horizontal directions to control the amount of white space that separates the selected images to facilitate the cutting of the medium into individual pictures; and (d) printing the arranged images.

12. The method of claim 1 further including the step of selecting which images are to be printed on each page.

13. The method of claim 2 wherein the size of the selected images in the vertical and horizontal directions is calculated and modified to minimize the amount of white space that separates the selected images.

14. The method of claim 5 wherein the size of the selected images in the vertical and horizontal directions is calculated and modified to minimize the amount of white space that separates the selected images.

15. The method of claim 6 wherein the size of the selected images in the vertical and horizontal directions is calculated and modified to minimize the amount of white space that separates the selected images.

16. A method for selecting and arranging digital images to be printed on a medium from a group of thumbnail images, comprising the steps of:

(a) displaying the group of thumbnail images;

(b) a user selecting a desired image template indicating the number of images to be printed per page;

(c) the user selecting, from the group of thumbnail images, the images which are to be printed within the selected image template;

(d) automatically arranging and rotating if necessary the selected images relative to the selected image template for printing; and (e) printing the arranged images.

* * * * *